US012684022B2

(12) United States Patent　(10) Patent No.: US 12,684,022 B2
Mirza et al.　(45) Date of Patent: Jul. 14, 2026

(54) TECHNIQUES FOR IMPROVED SERVICE CALL SESSION RESTORATION

(71) Applicant: T-Mobile USA, Inc., Bellevue, WA (US)

(72) Inventors: Khurram Ahmad Mirza, Bellevue, WA (US); Madhuri Kotta, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/620,742

(22) Filed: Mar. 28, 2024

(65) Prior Publication Data

US 2025/0310385 A1　Oct. 2, 2025

(51) Int. Cl.
*H04L 65/1045*　(2022.01)
*H04L 65/1016*　(2022.01)
*H04L 65/1073*　(2022.01)

(52) U.S. Cl.
CPC ...... *H04L 65/1045* (2022.05); *H04L 65/1073* (2013.01); *H04L 65/1016* (2013.01)

(58) Field of Classification Search
None
See application file for complete search history.

(56) References Cited

U.S. PATENT DOCUMENTS

| | | | |
|---|---|---|---|
| 2005/0190772 A1* | 9/2005 | Tsai | H04L 67/306 |
| | | | 370/465 |
| 2011/0185070 A1* | 7/2011 | Xue | H04L 65/1016 |
| | | | 709/227 |
| 2012/0042084 A1* | 2/2012 | Dutta | H04L 67/1004 |
| | | | 709/228 |
| 2015/0121123 A1* | 4/2015 | Bath | H04L 69/40 |
| | | | 714/4.11 |
| 2015/0195864 A1* | 7/2015 | Bartolome | H04W 88/182 |
| | | | 370/221 |
| 2017/0026423 A1* | 1/2017 | Merino Vazquez | |
| | | | H04L 65/1073 |
| 2023/0141522 A1* | 5/2023 | Sinha | H04W 8/08 |
| | | | 455/414.1 |

* cited by examiner

*Primary Examiner* — Mohamed Ibrahim
(74) *Attorney, Agent, or Firm* — Lee & Hayes, P.C.

(57)　ABSTRACT

Techniques are described herein for providing improved service call session restoration. In embodiments, such techniques may comprise storing, at a home subscriber server (HSS), information about a proxy call session control function (P-CSCF) node. The HSS may then receive an indication that a first service call session control function (S-CSCF) node is unresponsive. Upon receiving such an indication, the techniques may comprise determining, based on a user profile, that the first S-CSCF node is associated with the P-CSCF node; selecting, based on the information about the P-CSCF node, a second S-CSCF node to be associated with the P-CSCF node; and providing, by the HSS, at least a portion of the information about the P-CSCF node to the second S-CSCF node. The second S-CSCF node can then be configured to replace the first P-CSCF node using that information.

16 Claims, 6 Drawing Sheets

400

500

STORE INFO. ABOUT P-CSCF NODE AT HSS
502

RECEIVE INDICATION THAT FIRST S-CSCF NODE IS
UNRESPONSIVE
504

SELECT A SECOND S-CSCF NODE TO REPLACE THE FIRST S-
CSCF NODE
506

RECEIVE A REQUEST FROM THE SECOND S-CSCF NODE FOR
INFO ABOUT THE P-CSCF NODE
508

PROVIDE THE INFO. ABOUT THE P-CSCF NODE TO THE
SECOND S-CSCF NODE
510

TECHNIQUES FOR IMPROVED SERVICE CALL SESSION RESTORATION

BACKGROUND

Internet Protocol Multimedia Subsystem (IMS) is an architectural framework defined by the 3rd Generation Partnership Project (3GPP) for delivering Internet Protocol (IP) multimedia to user equipment (UE) of the IMS network. An IMS core network (sometimes referred to as the "IMS core", the "Core Network (CN)," or the "IM CN Subsystem") permits wireless and wireline devices to access IP multimedia, messaging, and voice applications and services. IMS allows for peer-to-peer communications, as well as client-to-server communications over an IP-based network.

During a registration procedure with the IMS core network, the UE is assigned a serving call session control function (S-CSCF) node and an application server (AS). These assigned nodes are tasked with serving the UE during a subsequent communication session, and all signaling originating from, and terminating at, the UE during the communication session is to be routed through the assigned nodes of the IMS core. However, it is possible for one or more of the assigned IMS nodes to become unavailable such that a communication session cannot be conducted using the now-unavailable node(s). For example, hardware and/or software of the assigned S-CSCF node and/or the assigned AS can malfunction or crash, rendering the IMS node inoperable.

When an assigned IMS node becomes unavailable during a communication session, after a brief retry period, an IMS restoration procedure is carried out to restore the communication session for the UE (as well as for other UEs assigned to the failed node) so that an available IMS node can continue to serve the UE. In at least some instances, existing IMS restoration procedures involve tearing down the existing communication session (e.g., sending an error response, such as a 504 error message, to the UE) in response to an IMS node becoming unavailable. This forces the UE to re-register with the IMS so that the UE can be re-assigned an available node (e.g., an available S-CSCF node). In this scenario, the service being provided to the UE is disrupted by the IMS restoration procedure. For example, a phone call may be dropped, and the user may be forced to re-dial the party with whom they were previously communicating.

Existing IMS restoration procedures can also involve unneeded communications between IMS nodes, which unnecessarily consumes network bandwidth during IMS restoration, and causes an undesirable delay that can be noticeable to the end user. For example, when a backup IMS node is called upon to provide service to a UE involved in a restoration procedure, the backup IMS node may transmit requests to other IMS nodes for additional information pertaining to the "unrecognized" UE (e.g., a profile recovery request), or to find a new IMS node to serve the UE, such as by issuing a third party register (TPR) message to discover a new, available AS to serve the UE, and so on. For a large number of UEs involved in a correspondingly large number of communication sessions that are affected by a failed IMS node(s), this added load on the network due to unneeded communication between IMS nodes can significantly impact network bandwidth.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
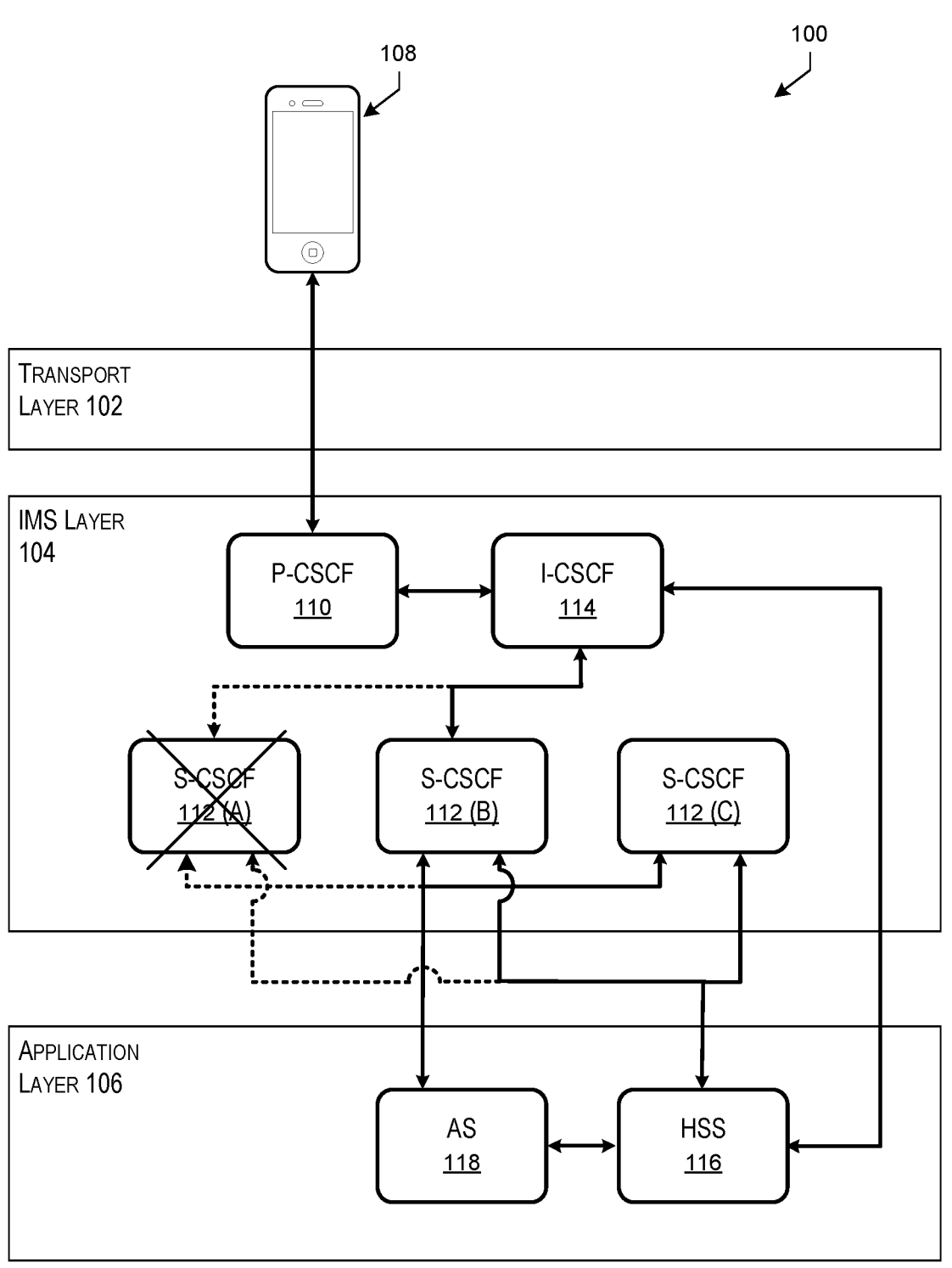
FIG. 1 depicts a diagram illustrating an overview of an IMS network having a number of nodes implemented in accordance with some embodiments.

This disclosure describes techniques and systems for restoring a communication session in the event of S-CSCF node unavailability. Prior to an IMS node (e.g., a S-CSCF node) becoming unavailable, information about a P-CSCF node can be stored at a home subscriber server (HSS), and this information can subsequently be used (i.e., obtained from the HSS repository) by individual IMS nodes in an independent fashion (i.e., by communicating directly with the HSS) to restore a communication session for a UE due to an unavailable IMS node. The P-CSCF node information can be provided to the HSS as part of a registration procedure for a UE assigned to the P-CSCF or it can be provided at periodic intervals (e.g., in status updates or "heartbeat" communications).

In embodiments, information including, but not limited to, a name, address, and/or capabilities associated with a P-CSCF node are conveyed to the HSS, which then stores that information within a data repository. In the event that a S-CSCF node is determined to be unresponsive, then the information can be used to identify an appropriate replacement S-CSCF node. In some cases, an optimal replacement may be determined as a S-CSCF node having the greatest commonality in provided capabilities. Hence, the HSS may be configured to select a S-CSCF node based on its greater likelihood to meet all of the requirements of the P-CSCF node.

Once an optimal S-CSCF node has been selected as a replacement to the unresponsive S-CSCF node, the HSS provides at least a portion of the P-CSCF node information to it. This allows the selected S-CSCF node to be assigned to the P-CSCF node while minimizing communications between IMS nodes.

It should be noted that the HSS typically is not in direct communication with a P-CSCF node and hence would not be able to obtain the information about the P-CSCF node after the S-CSCF node (its link to the P-CSCF node) has gone down. Hence, the use of P-CSCF node information in the manner disclosed would not be available in conventional systems. Furthermore, the storage of this information within the HSS repository allows an individual IMS node to interact directly with the HSS to obtain information it can use to restore the communication session without having to tear down the communication session or issue unneeded communications to other IMS nodes.

Embodiments of the disclosure provide for a number of advantages over conventional systems. For example, the implemented system allows for faster restoration of a communication session, as well as a reduction in network bandwidth consumption, as compared to existing IMS restoration procedures that take longer and consume more network bandwidth. This is due, at least in part, to the elimination of unneeded communication between IMS nodes, as well as the avoidance of tearing down an existing communication session in order to restore it. This, in turn, can reduce processor load significantly when a large number of UEs are involved in a correspondingly large number of ongoing communication sessions that have been impacted by an IMS node failure.

FIG. 1 depicts a diagram illustrating an overview of an IMS network 100 having a number of nodes implemented in accordance with some embodiments. In embodiments, the IMS network 100 may be made up of multiple layers, each of which includes a different set of nodes. For example, the IMS network may include at least a transport layer 102, an IMS layer 104, and an application layer 106.

A transport layer 102 may include any node (e.g., equipment) configured to provide access (e.g., ingress/egress) to the IMS network 100 for a number of user equipment (UE) 108. For example, a transport layer 102 may include a gateway device, such as a gateway that provides fixed access (e.g., digital subscriber line (DSL), cable modems, Ethernet, FTTx), mobile access (e.g., 5G NR, LTE, W-CDMA, CDMA2000, GSM, GPRS), and/or wireless access (e.g., WLAN, WiMAX).

An IMS layer 104 (also referred to as a control layer) may include any node configured to process SIP signaling packets within the IMS network 100. Such nodes may generally be referred to as Call Session Control Function (CSCF) nodes. CSCF nodes can be further distinguished based on their respective roles. For example, CSCF nodes may include a Proxy CSCF (P-CSCF), a Service CSCF (S-CSCF), and an Interrogating CSCF (I-CSCF). It is to be appreciated that the IMS network can include additional nodes that are not described herein such as nodes including, without limitation, an emergency CSCF (E-CSCF) node, a security gateway (SEG), a session border controller (SBC), and so on.

A P-CSCF node is a proxy device that acts as a first point of contact for UE 108 within the IMS Network. Each UE is assigned to a respective P-CSCF when it is registered with the IMS Network. A P-CSCF node can receive, via a communications interface, a Session Initiation Protocol (SIP) request from the UE 108 to be forwarded to a S-CSCF.

A S-CSCF node is the central nodes of the signaling plane and sits on the path of all signaling messages to/from a UE 108 that is assigned to it. There can be multiple S-CSCFs in the network for load distribution and high availability reasons. A S-CSCF is typically assigned to a user (or UE) by a Home Subscriber Server (HSS), when it's queried by the I-CSCF.

A S-CSCF node 112 may represent one of multiple available S-CSCF nodes (e.g., 112 (A-C)) that is chosen (or otherwise selected) for assignment to the UE 108. S-CSCF nodes, such as the S-CSCF node 112 (A), are sometimes referred to as "Registrars," and the process of allocating Registrars among users who are registering for IMS-based services is sometimes referred to as finding a "home CSCF" for the UE 108.

A I-CSCF node 114 is a SIP function node that acts as a forwarding point for external devices. The I-CSCF node 114 queries the HSS to determine S-CSCF/UE mapping and forwards SIP requests between the P-CSCF node 110 and the respective S-CSCF node 112.

An application layer 106 (also referred to as a service layer) may include one or more nodes capable of providing IMS-related services to the UE 108. In embodiments, the application layer 106 may include at least a Home Subscriber Server (HSS) 116 as well as a number of Application Servers (AS) 118. Note, however, that while the HSS 116 is described as being included in an application layer, the HSS 116 may be included in an IMS layer in some embodiments of an IMS network 100.

The HSS 116 is typically a master user database that supports the IMS network nodes that handle the calls/sessions. It contains user profiles, performs authentication and authorization of the user, and can provide information about the physical location of a user. A user profile may be associated with each UE 108 and may contain information about the current user. Such information may be downloaded by the S-CSCF assigned to the user when the user is registered on the network. The S-CSCF may typically receive that information in a User-data Attribute Value Pair (AVP) format.

An AS hosts and executes services, and interface with the S-CSCF using SIP. Depending on the actual service, the AS can operate in SIP proxy mode, SIP UA (user agent) mode or SIP B2BUA mode. An AS can be located in the IMS network 100 or in an external third-party network. If located in the IMS network 100, it may be able to query, or otherwise interact with the HSS 116 (e.g., using Diameter interfaces). In embodiments, the AS manages an application that provides communication between two or more UEs (e.g., UE 108 and at least one other UE). For example, the AS may manage an application that provides Voice over IP (VOIP) communications between UE devices.

The UE 108 may include any electronic device capable of interacting with the IMS network 100. In some non-limiting examples, the UE 108 may be a variety of devices including, for example: a mobile phone, a personal data assistant (PDA), or a mobile computer (e.g., a laptop, notebook, notepad, tablet, etc.) having mobile wireless data communication capability. The UE 108 may be configured to register for, and thereafter access and utilize, one or more IMS-based services via the IMS network 100. To this end, the UE 108 may be configured to transmit, via a radio access network (RAN), messages to the IMS network. For example, the UE 108 may transmit messages to the IMS network as part of an IMS registration procedure where the UE 108 is requesting to register for an IMS-based service.

In operation, the UE 108 may, upon registration with the IMS network 100, initially be assigned to a P-CSCF node 110 as well as a S-CSCF node 112 (A). Communications from the UE 108 to an AS 118 of the IMS network 100 are then routed form the UE 108 to the P-CSCF node 110 and then to the S-CSCF node 112 (A) (through forwarding by the I-CSCF node 114) and subsequently to the AS 118. Conversely, communications from an AS 118 of the IMS network 100 to the UE 108 are routed from the AS 118 to the S-CSCF node 112 (A) and then to the P-CSCF node 110 and subsequently to the UE 108.

During operation, a determination may be made that the S-CSCF node 112 (A) has become unavailable. For example, when the S-CSCF node 112 (A) is contacted by an entity, such as the P-CSCF node 110 or the AS 118, no response may be received from the S-CSCF node 112 (A), or the entity may receive a negative response from the S-CSCF node 112 (A) indicating unavailability.

When the S-CSCF node 112 (A) is determined to be unavailable, a restoration procedure will need to be performed in order to restore network functionality. In such a restoration procedure, a new S-CSCF node must be selected by the HSS to be assigned to the P-CSCF node 110 and UE 108. In such a case, if the P-CSCF node 110 was the entity that discovered the outage (e.g., the communication originated at the UE 108) then the HSS 116 may have information about the P-CSCF node 110 (through the I-CSCF node 114) that can be used in selecting an alternative S-CSCF node. However, if the AS 118 is the entity that discovered the outage (e.g., the communication is directed to the UE 108), then the HSS 116 would not have the ability to select a new S-CSCF node based on information about the P-CSCF node 110 in a conventional system as it has no direct access to the P-CSCF node 110. However, in embodiments of the disclosure, the HSS 116 stores information about the P-CSCF node 110 (e.g., information about capabilities of the P-CSCF node 110) that it can use to more accurately select the new S-CSCF node. Accordingly, the HSS 116 may select and assign a second S-CSCF node 112 (B) to the P-CSCF node 110 and UE 108 based on its ability to match the capabilities of the P-CSCF node 110.

In accordance with various embodiments described herein, the terms "user equipment (UE)," "wireless communication device," "wireless device," "communication device," "mobile device," and "client device," may be used interchangeably herein to describe any UE (e.g., the UE 108) that is capable of transmitting/receiving data over the IMS network, perhaps in combination with other networks. A users can utilize the UE 108 to communicate with other users and associated UEs via the IMS network. For example, a service provider may offer multimedia telephony services that allow a subscribed user to call or message other users via the IMS network using his/her UE 108. A user can also utilize the UE 108 to receive, provide, or otherwise interact with various different IMS-based services by accessing the IMS network. In this manner, an operator of the IMS network may offer any type of IMS-based service, such as, telephony services, emergency services (e.g., E911), gaming services, instant messaging services, presence services, video conferencing services, social networking and sharing services, location-based services, push-to-talk services, and so on.

Furthermore, the IMS network that includes the IMS nodes 110-114 may enable peer-to-peer, client-to-client, and/or client-to-server, communications over wired and/or wireless networks using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VOIP), Voice over LTE (VOLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The IMS network 100 of FIG. 1 may be maintained and/or operated by one or more service providers, such as one or more wireless carriers ("operators"), that provide mobile IMS-based services to users (sometimes called "subscribers") who are associated with UEs, such as the UE 108. The IMS network may represent any type of SIP-based network that is configured to handle/process SIP signaling packets or messages. SIP is a signaling protocol that can be used to establish, modify, and terminate multimedia sessions (e.g., a multimedia telephony call) over packet networks, and to authenticate access to IMS-based services. Individual nodes of the IMS nodes 110-114 of FIG. 1 can also be configured to transmit data to/from the HSS 116 using Diameter protocol over a Diameter (Cx) interface. Diameter protocol is defined by the Internet Engineering Task Force (IETF) in RFC 6733.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
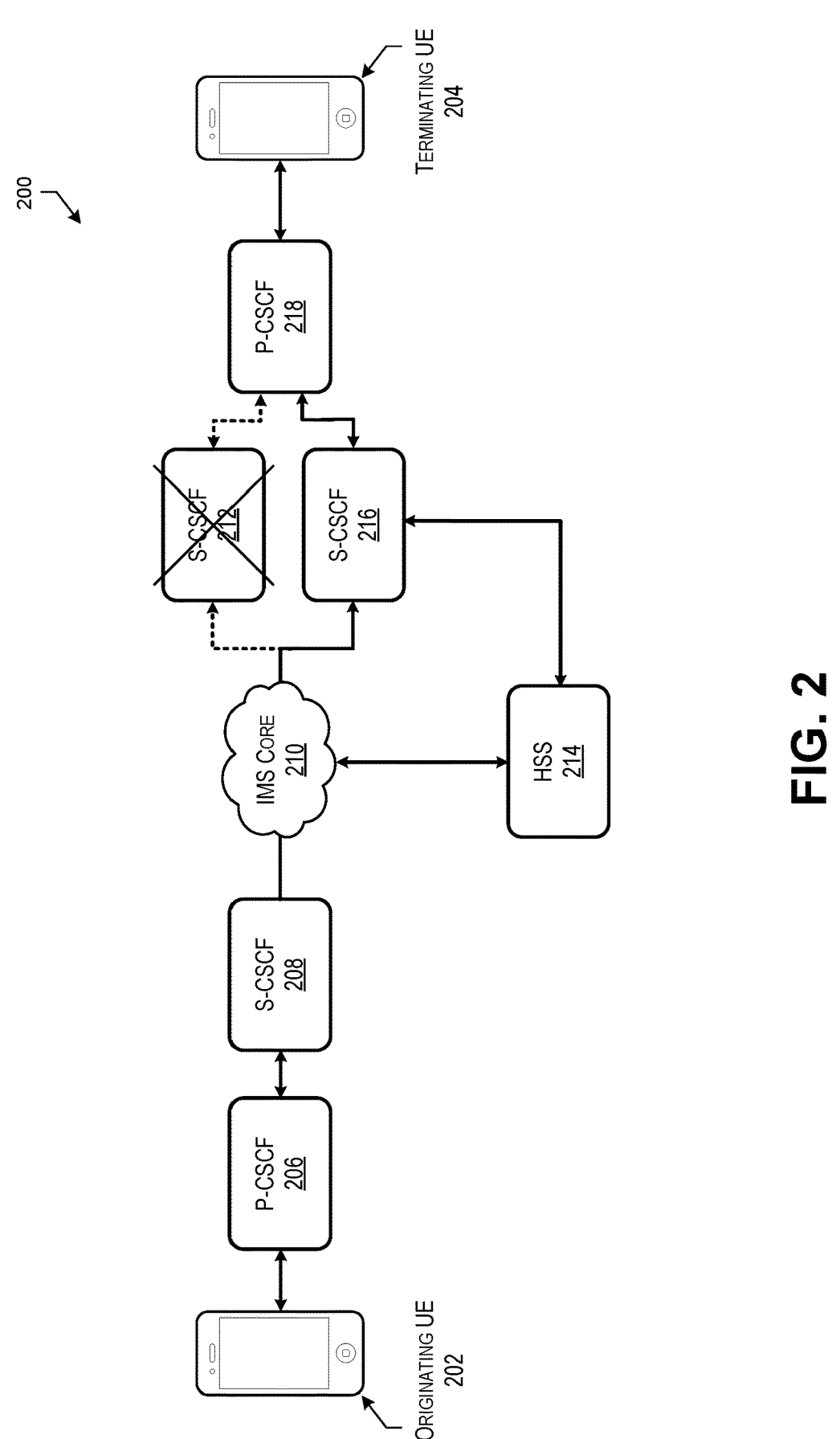
FIG. 2 depicts a block diagram illustrating a process for performing a session restoration process when providing an IMS service in accordance with embodiments.

FIG. 2 depicts a block diagram illustrating a process for performing a session restoration process when providing an IMS service in accordance with embodiments. In FIG. 2, the process 200 is represented as a number of interactions between various components of an IMS network. In embodiments, the components depicted in FIG. 2 may be examples of the components described in relation to the IMS network 100 as depicted in FIG. 1 above. For the purposes of the example depicted in FIG. 2, the IMS service is establishing a communication session between two UEs connected to the IMS network, and particularly, between an originating UE 202 and a terminating UE 204.

In an exemplary process 200, an originating UE 202 may initiate a communication session by sending a SIP request to a P-CSCF 206 assigned to the UE during a registration of the UE. The P-CSCF 206 then forwards the communication to the S-CSCF 208 assigned to the P-CSCF 206, which then relays the communication to an application server included in an application layer of an IMS core 210 of the IMS network.

In embodiments, the application server identifies the S-CSCF node 212 as being associated with the terminating UE 204. To do this, the application server may query a HSS 214 to determine the S-CSCF node 212 assigned to the UE 204. In the exemplary scenario, consider that the S-CSCF node 212 may be unavailable at the time that the communication is received. In such a scenario, the application server either receives no response from the S-CSCF node 212 or receives a response from the CSCF node 212 that indicates an outage (e.g., an error message). In such a case, the application server may provide a request to the HSS 214 in order to have a second S-CSCF node assigned to the terminating UE 204.

In embodiments, upon determining that the S-CSCF node 212 is unavailable, the HSS 214 may go about identifying an appropriate second S-CSCF node from a set of nodes that are currently available. The HSS 214 may issue a domain name system (DNS) query to a DNS server that returns IP addresses (e.g., IPv4, IPv6, etc.) of S-CSCF nodes in a pool of available S-CSCF nodes. In some embodiments, the HSS

214 can then determine which of the available S-CSCF nodes returned in response to the DNS query should be assigned to the UE 204.

In some embodiments, the DNS server that receives such a DNS query may further have access to a traffic distribution server having metrics related to the S-CSCF nodes from a pool of available S-CSCF nodes. The traffic distribution server may provide criteria that can be used in allocating a new S-CSCF node. Such criteria may include any suitable criteria, such as load balancing criteria and other service criteria. For example, the traffic distribution server may provide an indication that one S-CSCF node is experiencing less traffic than other S-CSCF nodes, or that it has a lower processing load as compared to other S-CSCF nodes that are overloaded or handling a high volume of network traffic.

Upon receiving information about a set of potential S-CSCF nodes, the HSS 214 may select one to be assigned to the UE 204. In embodiments, the HSS 214 may make such a determination based on information stored in memory related to the P-CSCF node 218 assigned to the UE 204. More particularly, the HSS 214 may store information about details (e.g., a name, address (e.g., IP address), etc.) and capabilities related to the P-CSCF node 218. In some cases, the HSS 214 will attempt to identify a S-CSCF node from the the set of potential S-CSCF nodes that best matches the capabilities provided by the P-CSCF node 218. In some cases, such capabilities may include an indication of various features that are supported by the P-CSCF node 218. For example, the capabilities may include an indication of a codec supported by the P-CSCF node 218. In some cases, the capabilities may include an indication of a value (e.g., a numeric value) associated with an attribute such as a maximum bandwidth supported by the P-CSCF node 218.

In some cases, the HSS 214 may perform vector similarity analysis to identify a S-CSCF node that most closely aligns with the capabilities of the P-CSCF node 218. In such cases, the HSS 214 may generate a vector for each S-CSCF node in the set of potential S-CSCF nodes with each capability offered by the respective S-CSCF being represented as a value along an axis associated within a dimensional space. In these cases, the vectors generated for each of the S-CSCF nodes in the set of potential S-CSCF nodes can be compared to a vector generated for the P-CSCF node 218 to identify a S-CSCF node 216 that is closest to the P-CSCF node 218. Once a S-CSCF node 216.

Upon selecting the S-CSCF node 216, the HSS may provide an indication of such an assignment to the S-CSCF node 216. In some cases, the HSS 214 provides an indication of the assignment to a I-CSCF node, which then provides a SIP request to the S-CSCF node 216.

In response to receiving the SIP request, the S-CSCF node 216 is configured to send a request for restoration information to the HSS 214 over a Diameter interface. This request may take the form of a server assignment request (SAR) message. The SAR message can include a server assignment type (SAT) value set to "NO_Assignment" in order to receive the registration data for the UE 204. An example of a SAR message may be as follows: SAR (IMPU, S-CSCF Name, SAT=NO_ASSIGNMENT), where IMPU is the IP multimedia public identity of the UE 204.

In response to receiving the SAR message, the HSS 214 can enable restoration and set a "reassignment pending" flag to TRUE, meaning that the UE 204 is in the process of being reassigned to a different S-CSCF node (in this case, the S-CSCF node 216). Once the HSS 214 overwrites the value for the S-CSCF name AVP with the identifier of the S-CSCF node 216, and the S-CSCF binding, the "reassignment pending" flag can be set to FALSE. Thereafter, the S-CSCF binding is updated in the HSS repository to reflect an association between the UE 204 and the S-CSCF node 216.

The S-CSCF node 216 can receive a server assignment answer (SAA) message from the HSS 214 over a Diameter interface in response to sending the SAR message. The SAA message can include the restoration information requested by the S-CSCF node 216 via the SAR message. An example of a SAA message is as follows: SAA (IMPU, User-Data, S-CSCF-Restoration-Info, Associated-Identities). The receipt of the SAA message by the S-CSCF node 216 informs it that it is was not originally assigned to the UE 204 during the registration procedure for the UE 204.

Additionally, the HSS 214 provides information about the P-CSCF node 218 (e.g., name, address, capabilities, etc.) to which the S-CSCF node 216 has now been assigned. This prevents the S-CSCF node 216 from needing to obtain that information from the P-CSCF node 218 directly, resulting in fewer transmitted communications and a quicker session restoration process.

Once the S-CSCF node 216 has been assigned to the P-CSCF node 218, the application server may be provided with the indication of the S-CSCF node 216 so that the communication can be relayed to it. The S-CSCF node 216, upon receiving that communication, then relays it to the P-CSCF node 218, which forwards the communication to the terminating UE 204.

Figure 3:
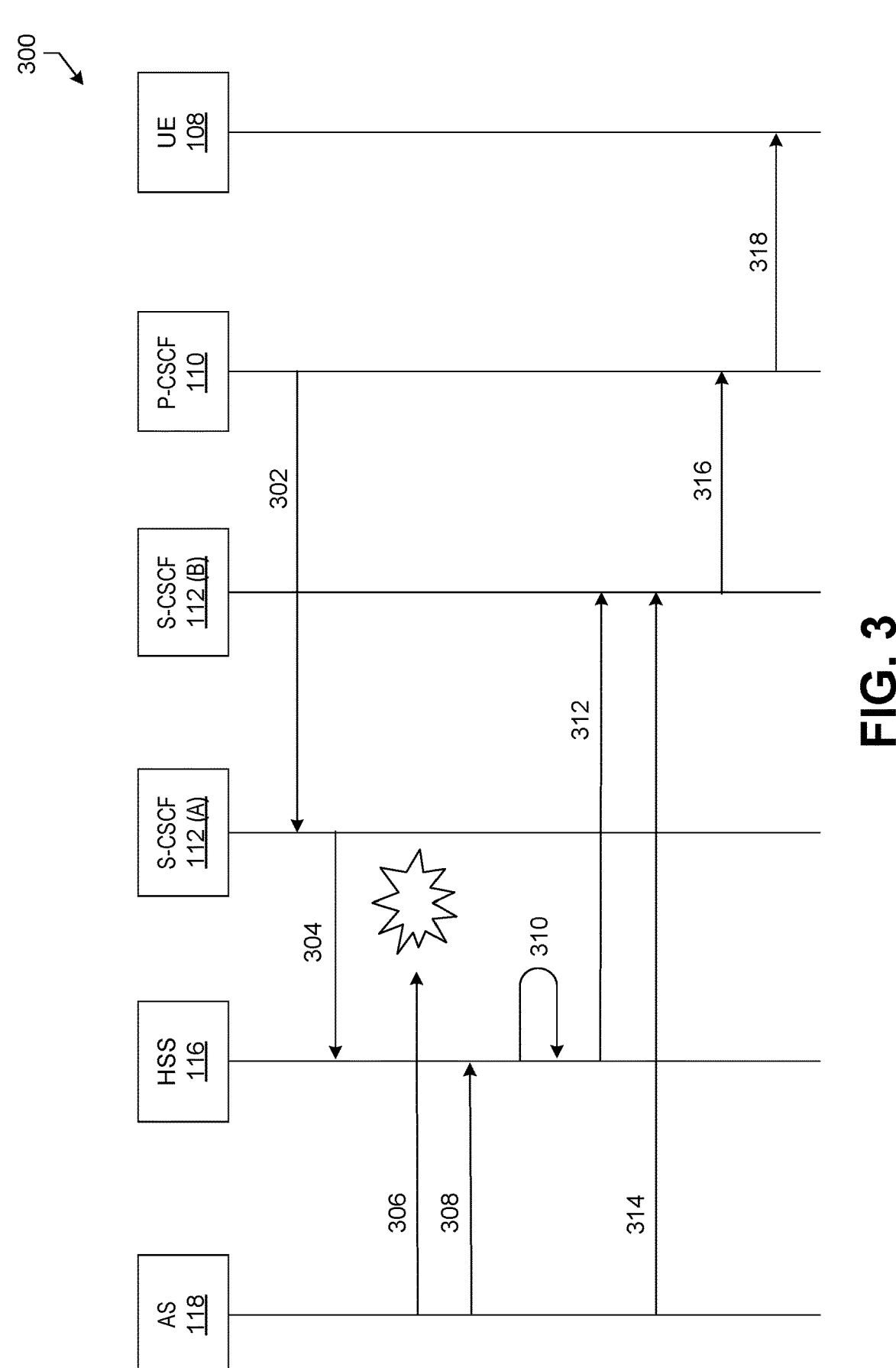
FIG. 3 depicts a swim lane diagram illustrating a process for optimally performing a restoration procedure without tearing down a current communication session in accordance with at least some embodiments.

FIG. 3 depicts a swim lane diagram illustrating a process for optimally performing a restoration procedure without tearing down a current communication session in accordance with at least some embodiments. More particularly, the block diagram illustrates example signaling between a UE (e.g., UE 108) and various IMS nodes within the IMS network to restore a communication session for the UE in the event of a first S-CSCF node 112 (A) becoming unavailable.

As noted elsewhere, a UE 108 may be assigned to both a P-CSCF node 110 as well as a S-CSCF node 112 (A) during a registration process. In embodiments, the P-CSCF node 110 may provide information about itself to the HSS. In some cases, this information may be provided by the P-CSCF node 110 to the HSS 116 during the registration procedure for the UE 108. In some cases, the P-CSCF node 110 provides such information to the HSS 116 at periodic intervals. For example, the P-CSCF node 110 may provide the information to the HSS 116 during a periodically-scheduled status update communication (e.g., a "heartbeat message'). The information about the P-CSCF node 110 that is provided to the HSS 116 may include any suitable information about the P-CSCF node 110 that can be used to reestablish an IMS session including, but not limited to, a name, an address, and an indication of capabilities provided by the P-CSCF node 110.

The HSS 116 can be associated with a master database (sometimes referred to herein as an "HSS repository") that maintains data pertaining to UEs that have registered, or are in the process of registering, on the IMS network. The information about the P-CSCF node 110 may be provided to the HSS 116 via routing through the S-CSCF node 112 (A). For example, the P-CSCF node 110 may provide the information to the S-CSCF node 112 (A) in a first communication at 302 and the S-CSCF node 112 (A) may forward that information to the HSS 116 in a second communication at 304. In embodiments, the information may be provided to the HSS 116 over a Diameter interface in the form of a profile update request (PUR) message.

At 306, a communication may be directed to the UE 108 via the S-CSCF node 112 (A). In some cases, the communication may be generated and transmitted by a AS 118. For example, an AS 118 may generate a communication directed to the UE 108 upon a second UE attempting to establish a communication session with the UE 108.

At this time, it may be discovered that the S-CSCF node 112 (A) is no longer available. The S-CSCF node 112 (A) may have experienced, after the UE's 108 successful registration, a network failure, or some other failure in hardware and/or software of the S-CSCF node 112 (A) that renders the S-CSCF node 112 (A) inoperative. Alternatively, the S-CSCF node 112 (A) may be operable but is nevertheless unreachable by the AS 118 (or another entity) for some reason (e.g., a fiber cut between the AS 118 and the S-CSCF node 112 (A)).

Upon discovering that the S-CSCF node 112 (A) is no longer available, the AS 118 may provide a notification to the HSS 116 to cause it to perform a restoration procedure at 308.

Upon receiving a notification that a S-CSCF node 112 (A) has become unavailable, the HSS 116 may initiate a restoration procedure at 310. Initially, the HSS 116 may identify the P-CSCF node 110 as being associated with the S-CSCF node 112 (A) based on assignment data stored in its data repository. The HSS 116 may further retrieve other information about the P-CSCF node 110 from its data repository to be used in restoring a connection to the P-CSCF node 110. The HSS 116 may then identify a set of available S-CSCF nodes that can act as a replacement for the S-CSCF node 112 (A) and may select a replacement S-CSCF node 112 (B) from that set of nodes. In some cases, the HSS 116 may make its selection based on information about the P-CSCF node 110, such as the information about the capabilities provided by the P-CSCF node 110. An exemplary process for selecting a S-CSCF node based on capabilities of the P-CSCF node is described in greater detail with respect to FIG. 4 below.

Upon identifying a replacement S-CSCF node 112 (B), the HSS 116 may provide instructions to the S-CSCF node 112 (B) (e.g., via a SIP request) to cause it to act as a replacement for the S-CSCF node 112 (A) at 312. The HSS 116 may further provide at least a portion of the retrieved information about the P-CSCF node 110 to the S-CSCF node 112 (B) in order to enable the S-CSCF node 112 (B) to be configured to replace the S-CSCF node 112 (A) while minimizing required communications. For example, since the S-CSCF node 112 (B) is provided all of the information about the P-CSCF node 110 that it needs to re-establish the session, this prevents the S-CSCF node 112 (B) from needing to communicate with the P-CSCF node 110 directly during the restoration procedure, which can reduce the time needed to restore the session as well as the bandwidth used in doing so.

Once the HSS 116 has received confirmation that the S-CSCF node 112 (B) has been configured to replace the S-CSCF node 112 (A), the HSS 116 may overwrite the information about the S-CSCF node 112 (A) in relation to the UE 108 with corresponding information for the S-CSCF node 112 (B). The HSS 116 may then notify the AS 118 that it may continue with the communication session while providing information about S-CSCF node 112 (B).

Once the AS 118 has received information indicating that S-CSCF node 112 (A) has been replaced with S-CSCF node 112 (B), the AS 118 may continue with the previous communication session. For example, the AS 118 may provide a SIP request to the S-CSCF node 112 (B) at 314, which is then forwarded to the P-CSCF node 110 at 316. The P-CSCF node 110 may then route the communication to the UE 108 at 318 in order to establish/reestablish the communication session.

Figure 4:
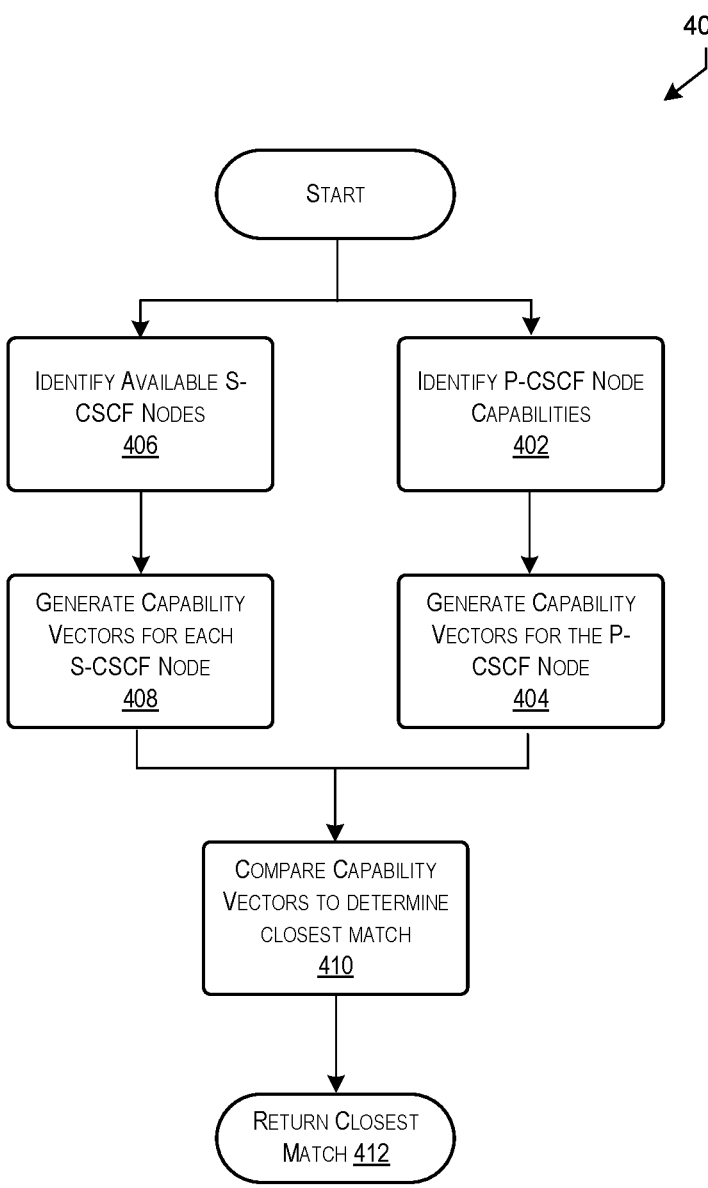
FIG. 4 depicts a block diagram illustrating an exemplary process for selecting an optimal replacement S-CSCF node in accordance with embodiments.

FIG. 4 depicts a block diagram illustrating an exemplary process for selecting an optimal replacement S-CSCF node in accordance with embodiments. As noted elsewhere, a HSS (or another suitable IMS node) may be configured to select an optimal replacement S-CSCF node for a S-CSCF node that is unresponsive. In such cases, the HSS may make such a selection based on a degree of similarity between the capabilities offered by the potential replacement S-CSCF node and the capabilities of an associated P-CSCF node.

Upon initiation of the exemplary process (e.g., Start), the HSS may identify a P-CSCF node that is associated with the unresponsive S-CSCF node. Such an association may be determined based on a mapping that was established upon registration of a user equipment at an earlier date. Upon identifying the respective P-CSCF node the HSS may retrieve information about a number of capabilities available to that P-CSCF node from a data repository at 402.

Once the HSS has obtained information about the capabilities available to the P-CSCF node, the HSS may generate a vector that is representative of that information at 404. Such a vector may be a representation of a position of the P-CSCF node within a multi-dimensional space. The vector may include a number of axes, each of which are associated with a capability. A position, or value, assigned to each axes may correspond to a magnitude, or value, of the capability. Some capabilities may be binary. For example, the P-CSCF node eithers support a particular application (e.g., a codec, etc.) or it does not. In this example, the value assigned to that vector along the axis associated with that capability may be either 0 or 1 depending on whether the capability is supported.

In some cases, various capabilities may have greater importance than others. In these cases, each capability may be provided with a weight value that corresponds to its level of importance, such that a value along a particular axis of the vector may be magnified (e.g., multiplied) based on its respective weight value.

In addition to generating a vector representative of the capabilities of the P-CSCF node, the HSS may further generate vectors representative of each of the potential replacement S-CSCF nodes (either in parallel or serially). At 406, the HSS may identify a set of potential (i.e., available) S-CSCF nodes. As noted elsewhere, available S-CSCF nodes may be identified by submitting a DNS query to a DNS server. In embodiments, the DNS server may make a determination as to which S-CSCF nodes are currently available based on current workload or bandwidth usage.

Upon determining a set of S-CSCF nodes that can potentially act as a replacement for the unresponsive S-CSCF node, the HSS may generate a vector for each of those in the set at 408. Each vector generated for a node in the set may be similar to the vector representative of the capabilities of the P-CSCF node, in that a position, or value, assigned to each axes of the vector may correspond to a magnitude, or value, of a respective capability. Each vector generated for a potential replacement S-CSCF node in the set of identified S-CSCF nodes may represent a respective position within the same multi-dimensional space in which the vector for the P-CSCF node resides.

Once respective capability vectors have been generated for each of the S-CSCF nodes in the set of available S-CSCF nodes, they may be compared to the capability vector of the P-CSCF node to identify a closest match at 410. In a vector similarity analysis, a distance between each of the S-CSCF node vectors and the P-CSCF node vector is calculated in order to identify the S-CSCF node for which its respective vector has the shortest distance. The S-CSCF node having the vector with the shortest distance to the vector of the P-CSCF node is then returned as a closest match at 412.

In the event that two or more S-CSCF nodes are tied for shortest distance, then other factors may be used to identify an appropriate replacement S-CSCF node. For example, the S-CSCF node having the lowest current workload or bandwidth usage may be selected. In some cases, ties may be resolved by selecting one of the tied S-CSCF nodes randomly.

Figure 5:
FIG. 5 depicts a flow chart illustrating an exemplary process for performing IMS session restoration in accordance with at least some embodiments.
Figure 5:
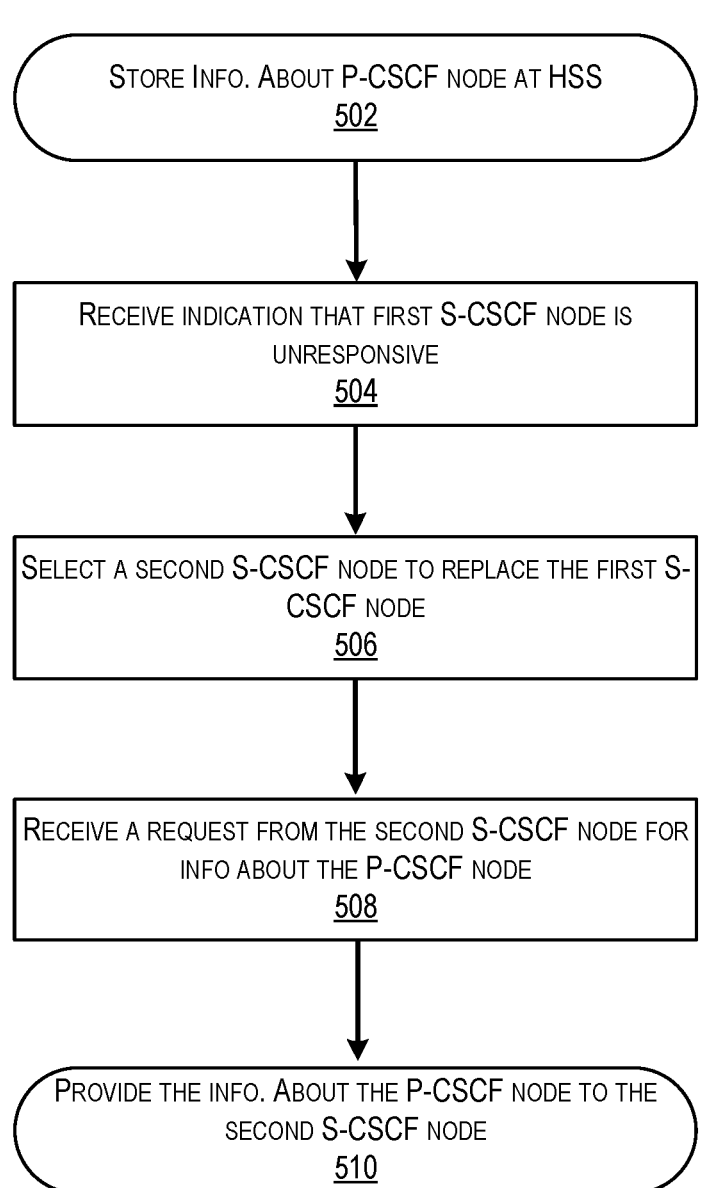

FIG. 5 depicts a flow chart illustrating an exemplary process for performing IMS session restoration in accordance with at least some embodiments. In embodiments, the process 500 may be performed on a home subscriber server (HSS) that is operating within an IMS network in order to provide IMS services. The HSS may maintain user profile data that stores information about individual accounts associated with the IMS network.

At 502, the process 500 may involve storing, in a data repository of the HSS, information about a proxy call session control function (P-CSCF) node. Such information about the P-CSCF node may include, but is not limited to, a name, an address, and/or an indication of one or more capabilities associated with the P-CSCF node. In some cases, the information about the P-CSCF node is received at the HSS when a user equipment associated with the P-CSCF is registered with the HSS. In some cases, the information about the P-CSCF node is received at the HSS on a periodic basis (e.g., in a "heartbeat" communication).

At 504, the process 500 may involve receiving an indication that a first service call session control function (S-CSCF) node is unresponsive. In some embodiments, the indication that the first S-CSCF node is unresponsive may include either a lack of response from the first S-CSCF node or an error code received from the first S-CSCF node. In some cases, the indication that the first S-CSCF node is unresponsive is received by an entity in relation to a communication directed by that entity toward a user equipment associated with the P-CSCF node.

At 506, the process 500 may involve determining a second S-CSCF node to replace the first S-CSCF node. In embodiments, the HSS is provided with an indication of one or more capabilities based on the communication. For example, if the communication is a voice over IP call, then an indication may be received at the HSS that the replacement S-CSCF node should support VOIP capabilities. Once the HSS has selected a second S-CSCF node to replace the first S-CSCF node, the HSS may provide a notification (e.g., via an I-CSCF node) to that second S-CSCF node to indicate that it has been selected as a replacement.

In embodiments, the first S-CSCF node is associated with the P-CSCF node during a registration of the user equipment. Accordingly, an association between the first S-CSCF node and the P-CSCF node may be determined based on an assignment mapping that was previously made by the HSS.

In embodiments, the second S-CSCF node is selected from a set of available S-CSCF nodes. For example, a set of available S-CSCF nodes may be identified by a DNS server via a domain name system (DNS) query as being available to serve as a replacement for the unavailable first S-CSCF node. In some embodiments, the set of C-CSCF nodes determined to be available is identified based on a current workload or bandwidth usage.

In embodiments, the second S-CSCF node is selected based on a degree of similarity between a first set of capabilities of the P-CSCF node and a second set of capabilities of the second S-CSCF node. For example, the second S-CSCF node may be selected using one or more vector similarity analysis techniques. In this example, the process 500 further involves generating a vector in which each of a number of capabilities supported by the second S-CSCF node are represented as a value along an axis in a multidimensional space.

At 508, the process 500 may involve receiving a request from the S-CSCF node for information about the P-CSCF node. In embodiments, when the S-CSCF node receives an indication that it has been selected as a replacement node, it may also receive information (e.g., from the I-CSCF node) about the P-CSCF node.

At 510, the process 500 may involve providing at least a portion of the information about the P-CSCF node to the second S-CSCF node. In embodiments, the second S-CSCF node is caused to be configured to replace the first S-CSCF node using the received portion of the information about the P-CSCF node. The second S-CSCF node may be configured to replace the first S-CSCF node absent (e.g., before) communicating with the P-CSCF node.

Figure 6:
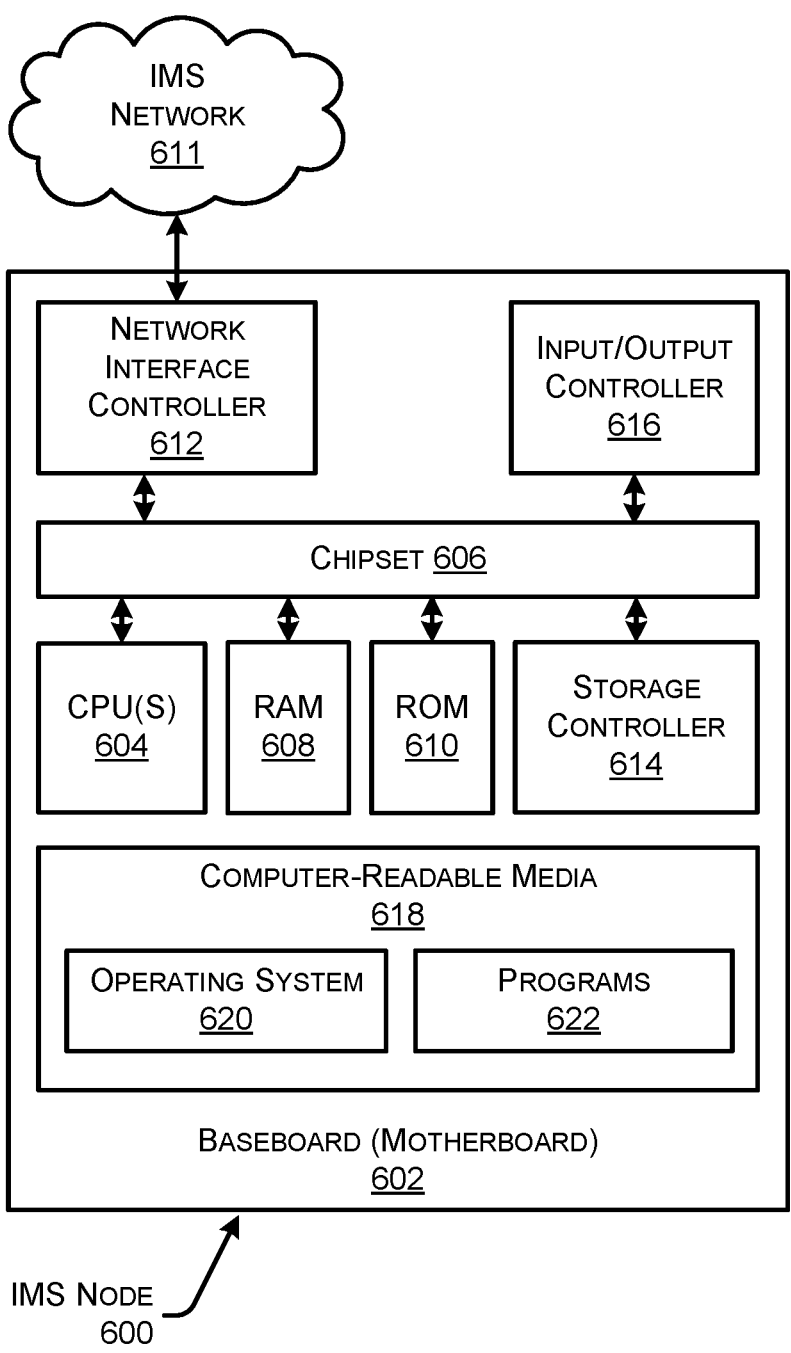
FIG. 6 shows an example computer architecture for an IMS node device capable of executing program components for implementing the functionality described above.

FIG. 6 shows an example computer architecture for an IMS node 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The IMS node 600 may, in some examples, correspond to a physical server as described herein, and may comprise networked devices such as servers, switches, routers, hubs, bridges, gateways, modems, repeaters, access points, etc.

The IMS node 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the IMS node 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the IMS node 600. The chipset 606 can further provide an interface to a computer-readable storage medium such as a read-only memory ("ROM") 610 or non-volatile RAM ("NVRAM") for storing basic routines that help to startup the IMS node 600 and to transfer information between the various components and devices. The ROM 610 or NVRAM can also store other software components necessary for the operation of the IMS node 600 in accordance with the configurations described herein.

The IMS node 600 can operate in a networked environment using logical connections to remote computing devices and computer systems through a network, such as the network 611 (which may be an IMS network). The chipset 606 can include functionality for providing network connectivity through a NIC 612, such as a gigabit Ethernet adapter. The NIC 612 is capable of connecting the IMS node 600 to other computing devices over the network 611. It should be appreciated that multiple NICs 612 can be present in the IMS node 600, connecting the computer to other types of networks and remote computer systems.

The IMS node 600 can be connected to a storage device 618 that provides non-volatile storage for the computer. The storage device 618 can store an operating system 620, programs 622, and data, which have been described in greater detail herein. The storage device 618 can be connected to the IMS node 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The IMS node 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the IMS node 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The IMS node 600 can further read information from the storage device 618 by detecting the physical states or characteristics of one or more particular locations within the physical storage units.

In addition to the mass storage device 618 described above, the IMS node 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the IMS node 600. In some examples, the operations performed by devices as described herein may be supported by one or more devices similar to IMS node 600. Stated otherwise, some or all of the operations performed by an edge device, and/or any components included therein, may be performed by one or more IMS node 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the IMS node 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the IMS node 600.

In one embodiment, the storage device 618 or other computer-readable storage media is encoded with computer-executable instructions which, when loaded into the IMS node 600, transform the computer from a general-purpose computing system into a special-purpose computer capable of implementing the embodiments described herein. These computer-executable instructions transform the IMS node 600 by specifying how the CPUs 604 transition between states, as described above. According to one embodiment, the IMS node 600 has access to computer-readable storage media storing computer-executable instructions which, when executed by the IMS node 600, perform the various processes described above with regard to the other figures. The IMS node 600 can also include computer-readable storage media having instructions stored thereupon for performing any of the other computer-implemented operations described herein.

The IMS node 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the IMS node 600 might not include all of the components shown in FIG. 6, can include other components that are not explicitly shown in FIG. 6, or might utilize an architecture completely different than that shown in FIG. 6.

As described herein, the IMS node 600 may include one or more hardware processors (e.g., CPUs 604) (processors) configured to execute one or more stored instructions. The processor(s) may comprise one or more cores. Further, the IMS node 600 may include one or more network interfaces configured to provide communications between the IMS node 600 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 611. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 622 may comprise any type of programs or processes to perform the techniques described in this disclosure. The programs 622 may comprise any type of program that cause the IMS node 600 to perform techniques for communicating with other devices using any type of protocol or standard usable for determining connectivity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, IMS node 600 may also include computer executable instructions that, when executed by processor(s), utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, the IMS node 600 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

storing, at a home subscriber server (HSS), information about a proxy call session control function (P-CSCF) node in association with information about a specific user equipment (UE) that has a connection supported by the P-CSCF node;

receiving, at the HSS, an indication that a first service call session control function (S-CSCF) node is unresponsive, wherein the first S-CSCF node was also associated with the connection of the specific UE;

selecting, by the HSS and based on the information about one or more capabilities, a second S-CSCF node to replace the first S-CSCF node for the connection of the specific UE, wherein the second S-CSCF node is selected from a set of available S-CSCF nodes and the set of available S-CSCF nodes are identified via a domain name system (DNS) query;

receiving, by the HSS from the second S-CSCF node, a request for the information about the P-CSCF node; and providing, by the HSS, at least a portion of the information about the P-CSCF node to the second S-CSCF node.

2. The method of claim 1, wherein the indication that the first S-CSCF node is unresponsive is received in relation to a communication directed toward the specific UE.

3. The method of claim 2, wherein the first S-CSCF node is associated with the P-CSCF node during a registration of the specific UE.

4. The method of claim 1, wherein the second S-CSCF node is selected using one or more vector similarity analysis techniques.

5. The method of claim 4, wherein the method further comprises generating a vector in which each of a number of capabilities supported by the second S-CSCF node are represented as a value along an axis in a multi-dimensional space.

6. The method of claim 1, wherein the indication that the first S-CSCF node is unresponsive comprises one of a lack of response from the first S-CSCF node or an error code received from the first S-CSCF node.

7. The method of claim 1, wherein the information about the P-CSCF node comprises an indication of one or more capabilities associated with the P-CSCF node.

8. A Home Subscriber Server (HSS) computing device comprising:
one or more processors; and
one or more non-transitory computer-readable media storing computer-executable instructions that, when executed by the one or more processors, cause computing device to perform operations comprising:
storing information about a proxy call session control function (P-CSCF) node in association with information about a specific user equipment (UE) that has a connection supported by the P-CSCF node;
receiving an indication that a first service call session control function (S-CSCF) node is unresponsive, wherein the first S-CSCF node was also associated with the connection of the specific UE;
selecting, based on the information about one or more capabilities, a second S-CSCF node to replace the first S-CSCF node for the connection of the specific UE, wherein the second S-CSCF node is selected from a set of S-CSCF nodes determined to be available and the set of S-CSCF nodes determined to be available is identified based on a current workload or bandwidth usage;
receiving, from the second S-CSCF node, a request for the information about the P-CSCF node; and providing at least a portion of the information about the P-CSCF node to the second S-CSCF node.

9. The computing device of claim 8, wherein the information about the specific UE is created upon registration of the specific UE.

10. The computing device of claim 8, wherein the information about the P-CSCF node comprises an indication of one or more capabilities associated with the P-CSCF node.

11. The computing device of claim 8, wherein the second S-CSCF node is selected based on a degree of similarity between the one or more capabilities and a second set of capabilities of the second S-CSCF node.

12. A system comprising:
at least one proxy call session control function (P-CSCF) node;
multiple service call session control function (S-CSCF) nodes; and
a home subscriber server (HSS) configured to:
store information about the P-CSCF node in association with information about a specific user equipment (UE) that has a connection supported by the P-CSCF node;
receive an indication that a first S-CSCF node of the multiple S-CSCF nodes is unresponsive, wherein the first S-CSCF node was also associated with the connection of the specific UE;
select, based on the information about one or more capabilities, a second S-CSCF node to replace the first S-CSCF node for the connection of the specific UE;
receiving, from the second S-CSCF node, a request for the information about the P-CSCF node; and
provide at least a portion of the information about the P-CSCF node to the second S-CSCF node.

13. The system of claim 12, wherein the second S-CSCF node is caused to be configured to replace the first S-CSCF node using the received portion of the information about the P-CSCF node.

14. The system of claim 13, wherein the second S-CSCF node is configured to replace the first S-CSCF node before communicating with the P-CSCF node.

15. The system of claim 12, wherein the information about the P-CSCF node is received at the HSS when the specific UE is registered with the HSS.

16. The system of claim 12, wherein the information about the P-CSCF node is received at the HSS on a periodic basis.

* * * * *